No. 863,737. PATENTED AUG. 20, 1907.
J. W. MARLER.
HUB ATTACHING DEVICE.
APPLICATION FILED FEB. 21, 1907.
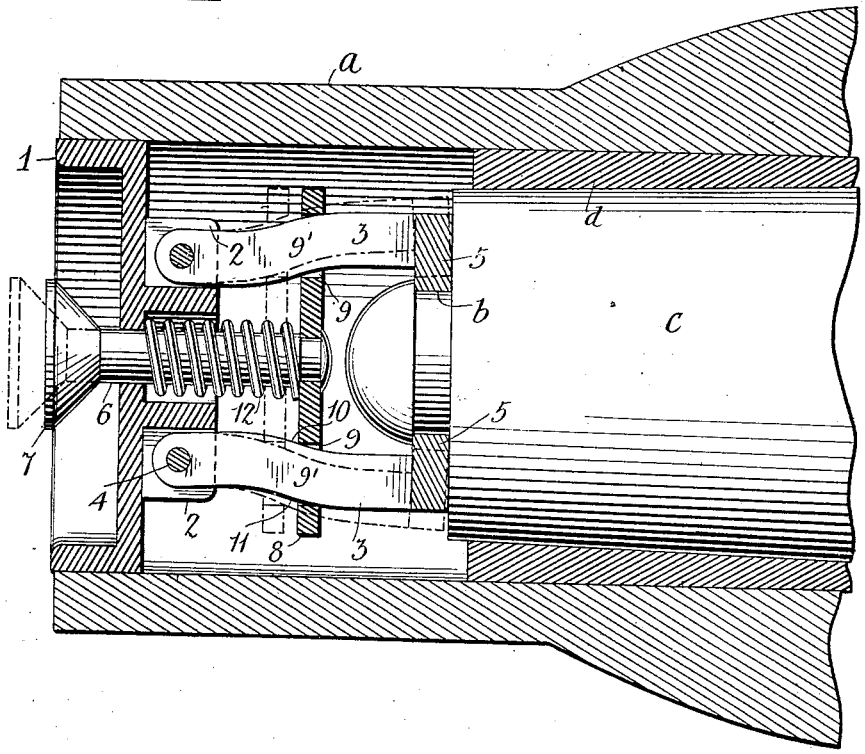
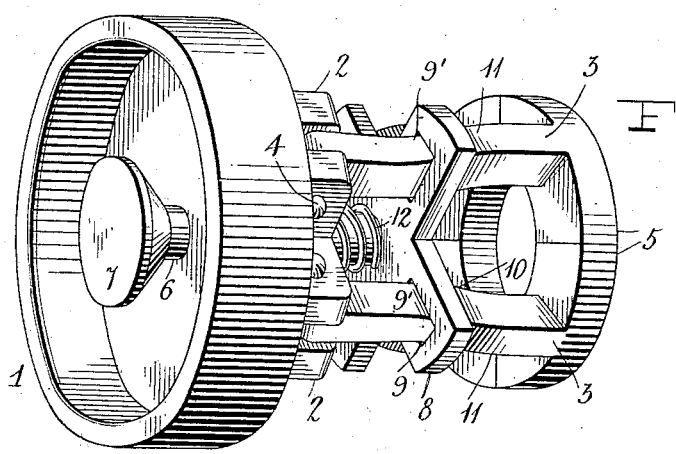
Witnesses
Inventor
James W. Marler
by H. B. Willson & Co.
Attorneys

UNITED STATES PATENT OFFICE.

JAMES W. MARLER, OF EAST BEND, NORTH CAROLINA.

HUB-ATTACHING DEVICE.

No. 863,737.  Specification of Letters Patent.  Patented Aug. 20, 1907.

Application filed February 21, 1907. Serial No. 358,715.

*To all whom it may concern:*

Be it known that I, JAMES W. MARLER, a citizen of the United States, residing at East Bend, in the county of Yadkin and State of North Carolina, have invented certain new and useful Improvements in Hub-Attaching Devices; and I do declare the following to be a full, clear, and exact description of the invention, such as will enable others skilled in the art to which it appertains to make and use the same.

My invention relates to improvements in devices for attaching the hubs of vehicle wheels to their spindles without the use of nuts.

The object of the invention is to provide a simple, durable and inexpensive device of this character, by means of which the wheel hub may be quickly and easily locked to its spindle or removed therefrom for cleaning, repairing and lubricating purposes.

With the above and other objects in view, the invention consists in the construction, combination and arrangement of devices hereinafter described and claimed.

In the accompanying drawings,—Figure 1 is a sectional view through a vehicle hub showing my improved device for securing it to the axle spindle; and Fig. 2 is a perspective view of my improved hub-attaching device.

My improved attaching device has a cap 1, which is adapted to be placed and to fit snugly in the outer end of the wheel hub $a$, and is provided with a central opening and with pairs of lugs 2, which are arranged around the said opening. Arms 3 have their outer ends pivotally-mounted between the pairs of lugs 2 by pins 4 and are provided at their inner ends with segment-shaped jaws 5, adapted to engage an annular groove $b$ near the outer end of the axle spindle $c$, so as to lock the hub to the said spindle while permitting it to revolve thereon. The sleeve or boxing is indicated at $d$.

An operating rod 6 extends through the central opening in the cap 1 and is provided at its outer end with a knob 7. To the inner end of the said operating rod is secured a head 8, which is provided with openings 9, through which the arms 3 extend. Each of the said arms is provided with a curved or otherwise suitably shaped cam portion 9' having an inner face 10 and an outer face 11, and the openings in the head 8, through which the said arms extend, enable said head to engage either of said cam faces according to the direction of movement of said head. A spring 12 which is here shown as a coiled extensile spring is employed to normally move the head 8 inwardly and cause said head, by coaction with the outer cam faces of the arms 9, to move the free ends of the said arms inwardly so as to engage their segmental jaws with the groove $b$ of the axle spindle. The said spring 12 is placed on the inner portion of the operating rod 6 and bears between the head 8 and the cap 1.

In order to detach the hub from the axle spindle, it is only necessary to draw the operating rod 6 outwardly by grasping the knob 7 thereof, so as to cause the head 8 to move outwardly with said rod. As the said head thus moves outwardly, it engages the inner cam faces 10 of the arms 3 and hence moves the free ends of said arms outwardly and thereby causes their segmental jaws to move outwardly from the groove $b$ and clear the outer end of the axle spindle.

It will be understood that any suitable number of arms 3 may be employed. Four are here shown.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claims.

Having thus described my invention, what I claim as new, and desire to secure by Letters-Patent, is,—

1. The herein-described hub-attaching device comprising a cap to be placed in the outer end of a wheel hub, arms pivotally connected to the said cap having jaws for engaging with an annular groove in the axle spindle and further provided with cam portions having outer and inner cam faces, an operating rod mounted in the cap, a head attached to said rod and connected to the said arms for engagement with the inner or outer cam faces of said arms according to the direction in which said head is moved, and a spring normally acting on said head to cause the same to draw the inner ends of said arms toward each other and keep the jaws thereof in engagement with the groove of the axle spindle.

2. The herein-described hub-attaching device comprising a cap for attachment to the outer end of a hub, arms pivotally connected to the said cap and having jaws at their inner ends to engage an annular groove of an axle spindle, a head connected to the said arms and movable with relation thereto, said head and said arms having coacting cam devices to cause said head to move said arms toward or from each other according to the direction in which said head is moved, a spring to move said head in one direction, and means to move said head in the reverse direction.

In testimony whereof I have hereunto set my hand in presence of two subscribing witnesses.

JAMES W. MARLER.

Witnesses:
 WM. C. POINDEXTER,
 J. LEE NORMAN.